(12) United States Patent
Quantz et al.

(10) Patent No.: US 6,182,562 B1
(45) Date of Patent: Feb. 6, 2001

(54) CRACKING DIE ASSEMBLY FOR HIGH PRODUCTION NUTCRACKING APPARATUS

(75) Inventors: James Bland Quantz, Lexington; Pascal Walter Pitts, Cayce, both of SC (US)

(73) Assignee: Machine Design Incorporated, West Columbia, SC (US)

( * ) Notice: Under 35 U.S.C. 154(b), the term of this patent shall be extended for 0 days.

(21) Appl. No.: 09/592,245

(22) Filed: Jun. 13, 2000

(51) Int. Cl.⁷ .................................................. A23N 5/00
(52) U.S. Cl. ................................ 99/571; 99/574; 99/581
(58) Field of Search ........................ 99/568, 571–576, 99/577–579, 580–583, 600; 426/481, 482; 30/120.1–120.5; 198/622

(56) References Cited

U.S. PATENT DOCUMENTS

| | | | |
|---|---|---|---|
| 1,160,376 | * 11/1915 | Gilson | 99/569 |
| 1,208,324 | * 12/1916 | Canale | 99/572 |
| 1,342,691 | * 6/1920 | Pape | 99/582 X |
| 1,470,247 | * 10/1923 | Wilms | 99/572 |
| 1,901,798 | * 3/1933 | Boomer | 99/586 X |
| 2,067,566 | * 1/1937 | Field | 99/582 |
| 2,635,662 | * 4/1953 | Doering et al. | 198/622 X |
| 2,903,134 | * 9/1959 | Ashlock, Jr. | 99/569 X |
| 3,561,513 | * 2/1971 | Lindsey | 99/571 |
| 3,621,898 | * 11/1971 | Turner | 99/571 |
| 3,871,275 | * 3/1975 | Quantz | 99/571 |
| 4,332,827 | 6/1982 | Quantz . | |
| 4,418,617 | * 12/1983 | Quantz | 99/581 X |
| 4,441,414 | * 4/1984 | Quantz | 99/571 |
| 5,623,867 | 4/1997 | Quantz . | |

* cited by examiner

*Primary Examiner*—Timothy F. Simone
(74) *Attorney, Agent, or Firm*—Alston & Bird LLP

(57) ABSTRACT

A cracking die assembly which is adapted for use in a high production nutcracking apparatus of the type wherein a nut is held between an anvil and a cracking die, and a shuttle then impacts against the rear end face of the cracking die to sharply advance the cracking die and thereby crack the shell of the nut. The cracking die assembly includes a mounting sleeve having a bore with an internal shoulder, and a tubular retainer mounted within a portion of the sleeve bore so as to engage the shoulder of the sleeve. An annular gasket is fixedly mounted in the bore of the retainer, and the cracking die is mounted in the bore of the retainer, and the cracking die has a radial flange which is positioned to lie between the shoulder in the bore of the sleeve, and the gasket. Also, the gasket and radial flange have conforming conical surfaces which engage when the cracking die is impacted by the shuttle, to thereby absorb the impacting force of the shuttle.

10 Claims, 1 Drawing Sheet

CRACKING DIE ASSEMBLY FOR HIGH PRODUCTION NUTCRACKING APPARATUS

BACKGROUND OF THE INVENTION

The present invention generally relates to an improved cracking die assembly for use in a high production nutcracking apparatus.

In applicant's prior U.S. Pat. No. 3,871,275, there is disclosed a high production nutcracking apparatus wherein a plurality of cracking units are arranged on a rotatable turret, with each cracking unit having an opening adapted to receive an individual nut which is dropped from a feed conveyor as the cracking unit moves through its top center position. Each cracking unit includes an anvil mounted on one side of the opening, and a cracking die mounted for limited movement on the other side of the opening and so that the anvil and cracking die are adapted to receive and hold the nut therebetween. A free floating shuttle is mounted rearwardly of the die, and the shuttle is thrust forwardly into impacting engagement with the rearward side of the cracking die after the nut is received in the opening, and so that the shell of the retained nut will be cracked by the resulting forward movement of the die.

Applicant's prior U.S. Pat., Nos. 4,332,827 and 5,623,867, disclose improved high production nutcracking apparatus, which includes an improved nut feeding conveyor by which the nuts are singularized and oriented prior to being delivered to the individual cracking units.

Applicant's prior U.S. Pat. No. 4,441,414 discloses a cracking die assembly for a high speed nutcracking apparatus of the type disclosed in the above patents and which comprises a retainer mounted within the bore of a mounting sleeve. The cracking die has a radial flange mounted to oppose a shoulder in the bore of the retainer so as to permit limited movement in the axial direction, and an annular resilient gasket is disposed between the flange of the die and the retainer shoulder and so as to absorb at least a portion of the impacting force from the shuttle.

During high speed operation, the annular gaskets are subjected to repeated impacts and to heat generated from the friction resulting from the relative axial movement between the gasket and the retainer, and between the gasket and the die. As a result, the gasket rapidly deteriorates in use, requiring repeated disassembly of the cracking die assembly. Further, the cracking die and annular gasket as described in the '414 patent have been found to act as a pump during axial reciprocation of the crack die, which tends to suck debris, such as shell fragments and nut oil, into the interior of retainer, which compounds the wear problem.

It is accordingly an object of the present invention to provide a cracking die assembly adapted for use in a high speed nutcracking apparatus of the described type, and which effectively avoids the above noted problems associated with the prior assembly design.

It is a more particular object of the present invention to provide a cracking die assembly of the described type, and which possesses sufficient inherent strength to withstand rapidly repeated impacts, and which effectively precludes the passage of shell fragments and nut oil rearwardly past the gasket and into the interior of the mounting sleeve.

SUMMARY OF THE INVENTION

The above and other objects and advantages of the present invention are achieved by the provision of a cracking die assembly which comprises a mounting sleeve having an internal bore which includes a forwardly facing radial shoulder, and a tubular retainer coaxially mounted in the bore of the sleeve forwardly of the shoulder. An annular gasket is mounted within the bore of the retainer, and the annular gasket has a rearwardly facing conical end face which is spaced from the radial shoulder of the sleeve.

A cracking die is disposed coaxially within the bore of the retainer and the die includes a radial flange having a forwardly facing conical shoulder which opposes the conical end face of the gasket. The inclination of the conical shoulder of the radial flange closely matches the inclination of the conical end face of the gasket. Thus when the cracking die is impacted by the shuttle during the cracking process, the die moves sharply forward and the conical shoulder on the flange of the die impacts against the conical end face of the gasket, so that the annular gasket absorbs the impacting force.

The inclination of these mating conical surfaces on the gasket and flange shoulder, which is preferably between about 30° to 60° from a perpendicular plane, acts to spread the load of the cracking impact over a larger contact area, thereby minimizing wear.

The annular gasket is preferably locked against axial movement in the retainer, so as to eliminate the heat generated by the friction associated with its axial movement. Also, the gasket includes a flexible sealing lip which engages the die so as to further reduce friction and also prevent the inflow of air and debris into the interior of the retainer.

The bore of the retainer also preferably includes one or more axial slots to permit the passage of air around the radial flange of the cracking die during axial movement of the die. The slots not only facilitate this axial movement by eliminating closed air pockets, but they also further prevent the inflow of air and debris into the interior of the retainer.

BRIEF DESCRIPTION OF THE DRAWINGS

Some of the objects of the invention having been stated, other objects and advantages will appear as the description proceeds, when taken in connection with the accompanying drawings, in which.

DETAILED DESCRIPTION OF THE INVENTION

Figure 1:
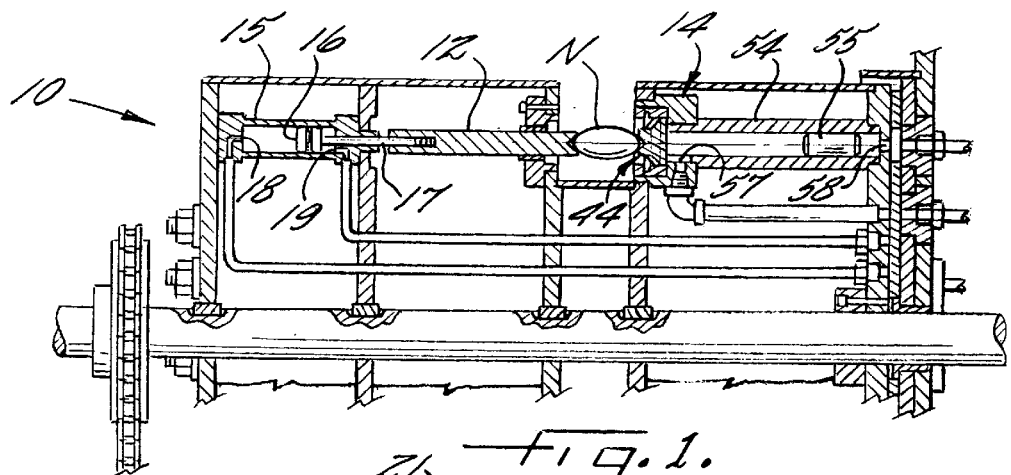
FIG. 1 is a fragmentary sectional side elevation view of a nutcracking apparatus which embodies the features of the present invention.

Referring more particularly to the drawings, there is illustrated in FIG. 1 a cracking unit 10 of a high production nutcracking apparatus which embodies the features of the present invention. While a single unit 10 is illustrated, it will be understood that in a preferred embodiment, several such units are mounted on a rotatable turret as disclosed in applicant's prior U.S. Pat. Nos. 3,871,275; 4,332,827; and 5,623,867, the disclosures of which are expressly incorporated herein by reference.

The cracking unit 10 comprises an anvil 12, a cracking die assembly 14, and means mounting the anvil and cracking die assembly in an axially aligned, opposed relationship to define an opening for receiving a nut N therebetween. More particularly, the means for mounting the anvil 12 includes a first air cylinder 15, a piston 16 slideably disposed within the cylinder, a piston rod 17 interconnecting the piston and anvil, a first air port 18 disposed adjacent the rearward end of the cylinder 15, and a second air port 19 disposed adjacent the forward end of the cylinder. As will be apparent, movement of the piston 16 results in a corresponding movement of the anvil 12, either forwardly toward the cracking die assembly 14 or rearwardly therefrom. Such movement is controlled by air which is selectively provided to the first and second ports in a manner more fully disclosed below, and as further described in applicant's above noted prior patents.

The cracking die assembly 14 includes a mounting sleeve 21 defining a forward end 22 and a rearward end 23, and which has a stepped internal cylindrical bore which includes a forwardly facing radial shoulder 24 intermediate the ends.

Figure 3:
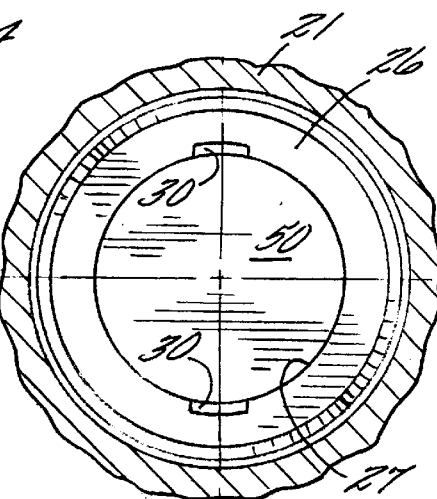
FIG. 3 is a sectional view taken along the line 33 of FIG. 2.
Figure 4:
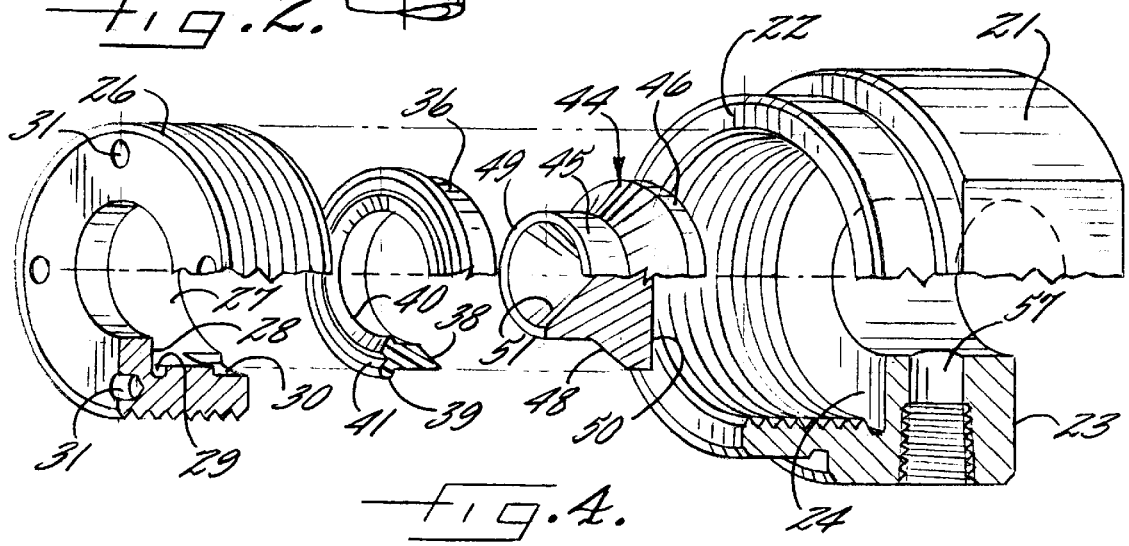
FIG. 4 is an exploded perspective view of the cracking die assembly.

A tubular retainer 26 is coaxially mounted in the forward end portion of the sleeve bore, and the retainer 26 includes a stepped internal cylindrical bore 27 (FIG. 4) which is coaxial with the bore of the sleeve 21 and which includes a rearwardly facing shoulder 28 intermediate its ends and which is spaced oppositely from the sleeve shoulder 24. The bore 27 also includes an annular channel 29 intermediate its ends, and the rearward end portion of the bore 28 includes a pair of slots 30 (FIG. 3) for the purpose explained below.

The retainer 26 is removably mounted in the sleeve bore by means of cooperating threads, and so that its inner end engages the shoulder 24 of the sleeve. A plurality of indentations 31 are provided in the forward end face of the retainer to permit the retainer to be mechanically gripped by a suitable spanner wrench for rotation relative to the sleeve and removal therefrom to facilitate periodic cleaning or repair.

An annular gasket 36 is mounted within the internal bore 28 of the retainer 26, so as to rest against the shoulder 28, and the annular gasket 36 has a rearwardly facing conical end face 38 which is spaced from the radial shoulder 24 of the sleeve 21. The gasket 36 is preferably composed of a high density plastic material, such the urethane identified as Product No. P4300A90 by Dupont. The gasket is formed by molding so as to include a peripheral ring 39 which is received in the channel 29 in the bore 27 of the retainer. Thus the annular gasket 36 is fixed within the internal bore 28 so as to prevent relative movement in both axial directions. The annular gasket 36 also includes an integral sealing lip 40 which extends radially inwardly. To render the sealing lip more flexible for the purposes to become apparent, the front end face of the gasket includes an annular channel or notch 41.

A cracking die 44 is mounted coaxially within the retainer 26. The die 44 is preferably composed of a solid metallic material, such as an aluminum alloy, and it includes a cylindrical forward end portion 45 which is received within the bore of the gasket 36 and a radial flange 46 disposed within the rearward bore portion of the retainer adjacent the shoulder 24. The flange 46 has an axial dimension less than the distance between the sleeve shoulder 24 and the conical end face 38 of the gasket 36, so as to permit limited axial movement of the die. Also, the flange 46 of the die 44 includes a forwardly facing conical shoulder 48 which opposes the conical end face 38 of the gasket 36 and which has an inclination which matches the inclination of the conical end face of the gasket. Preferably, the inclination of those mating surfaces is between about 30° and 60°, and most preferably is about 45°.

The cylindrical forward end portion 45 of the die extends forwardly from the conical shoulder 48, through the gasket 36, and to a forward end face 49. The sealing lip 40 of the gasket engages the cylindrical portion 45 about its entire periphery so as to prevent the passage of foreign substances past the cracking die during its axial movement. The radial flange 46 of the die has an axial dimension less than the distance between the shoulder 24 and the end face 38 for permitting limited axial movement of the die.

The die 44 further includes a generally flat rearward end face 50 which is perpendicular to the central axis defined by the sleeve and retainer, and the forward end face 49 has an axial depression 51 formed therein which is adapted to receive a portion of a nut N to be cracked. The axial depression 51 is of conical cross sectional configuration.

The cracking die assembly 14 further includes a second air cylinder 54 mounted coaxially at the rearward end of the sleeve 21, and a free floating shuttle 55 is mounted within the air cylinder 54. In addition, there is provided an air port 57 adjacent the forward end of the cylinder, and a further port 58 which extends axially through the rearward end of the cylinder.

Figure 2:
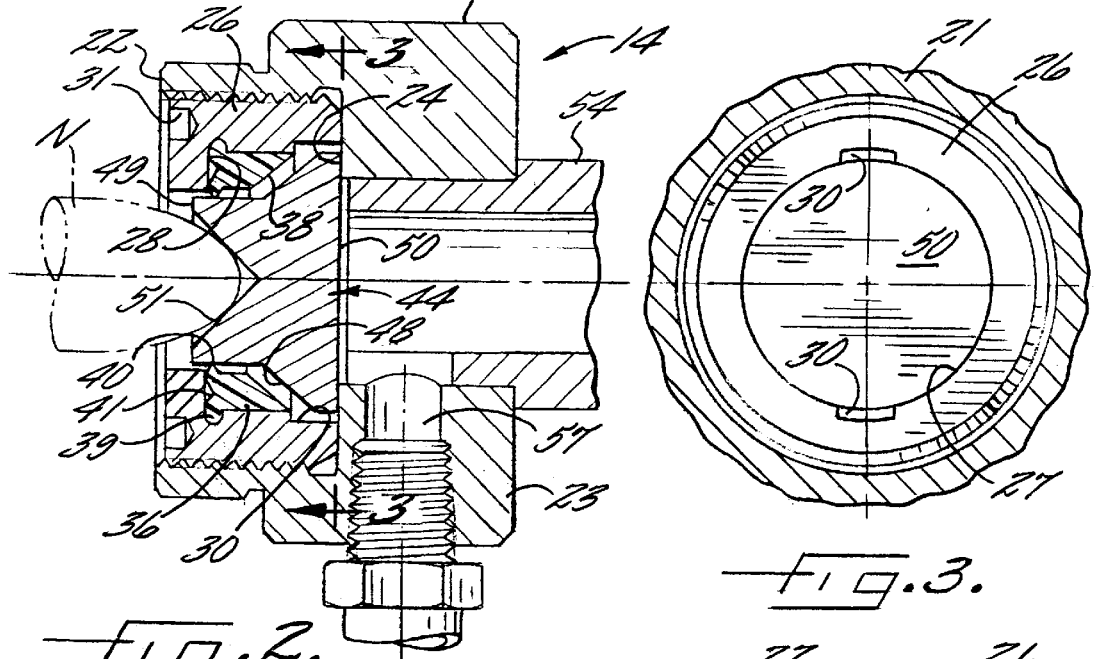
FIG. 2 is an enlarged sectional view of the cracking die assembly of the apparatus illustrated in FIG. 1.

The control system for cyclically actuating the cracking unit includes an air control system whereby air is selectively introduced into the four ports 18, 19, 57, and 58. More particularly, upon receiving a nut N in the opening between the anvil 12 and cracking die assembly 14, air is first introduced into the port 18 so that the piston 16 and anvil 12 are moved forwardly and such that the anvil 12 operatively engages one end of the nut N in the opening. The nut thereby becomes supported between the anvil 12 and die 44, and the force provided by the anvil acts through the nut to move the cracking die rearwardly so that the flange 46 contacts the shoulder 24, as seen in FIG. 2. The anvil 12 and cracking die 44 thereby also serve to compressively stress the retained nut. High pressure air is next injected through the port 58 and into the air cylinder 54, such that the shuttle 55 is thrust forwardly along the cylinder and impacts against the rearward end face 50 of the cracking die, causing the cracking die to sharply advance a short distance forwardly against the nut and thereby crack its shell. In the absence of a nut in the opening, the gasket 36 will absorb the entire impacting force, and even during normal cracking it is believed the gasket may absorb at least a significant portion of the impacting force. The air in front of the advancing shuttle is permitted to exhaust through the port 57. Air next enters the port 19, causing the piston 16 and anvil 12 to move rearwardly and release the nut, and as a final step, air is caused to enter the port 57 and thereby return the shuttle 55 to its rearward position. The apparatus is then in position to receive another nut to be cracked, with the above cycle being cyclically repeated. Further details regarding the air control system for cyclically actuating the unit 10 may be obtained from applicant's above noted prior patents.

In the drawings and specification, there has been set forth a preferred embodiment of the invention, and although specific terms are employed, they are used in a generic and descriptive sense only and not for purposes of limitation.

That which is claimed:

1. A cracking die assembly adapted for use in a high production nutcracking apparatus, and comprising
   a mounting sleeve having an internal bore which defines a central axis and which includes a forwardly facing radial shoulder intermediate its ends,
   a tubular retainer mounted within said bore of said sleeve forwardly of said shoulder, with said retainer including an internal bore which is coaxial with respect to the central axis, an annular gasket mounted within the internal bore of said retainer, with said annular gasket having a rearwardly facing conical end face which is spaced from the radial shoulder of said sleeve, a cracking die disposed coaxially within said internal bore of said retainer and including a radial flange disposed between said sleeve shoulder and said end face of said gasket, with said flange having an axial dimension less than the distance between said sleeve shoulder and said end face of said gasket for permitting limited axial movement of said die, and with said flange of said die including a forwardly facing conical shoulder which opposes the conical end face of said gasket and which has an inclination which matches the inclination of the conical end face of said gasket, and with said die having a forward end face which is adapted to engage the end of a nut to be cracked and an opposite end face which is perpendicular to said central axis, whereby said cracking die is adapted to be impacted on said opposite end face and be sharply thrust forwardly a limited distance so as to impart a cracking force to a nut engaged by said forward end face of said die, and with the conical end face of the annular gasket being impacted by the conical shoulder on the flange of the die so that the annular gasket absorbs at least a portion of the impacting force.

2. The cracking die assembly as defined in claim 1 wherein said annular gasket is fixed within said internal bore of said retainer so as to prevent relative movement in both axial directions.

3. The cracking die assembly as defined in claim 2 wherein said die includes a cylindrical portion which extends forwardly from said conical shoulder of said radial flange and to said front end face, and wherein said gasket includes an annular sealing lip which engages the cylindrical portion about its entire periphery so as to prevent the passage of foreign substances past the cracking die during axial movement of the cracking die.

4. The cracking die assembly as defined in claim 3 wherein the radial flange of said cracking die has a diameter slightly less than the diameter of the internal bore of the retainer, and wherein the internal bore of said retainer includes at least one axial slot to permit the passage of air around said radial flange of said die during axial movement of the die.

5. The cracking die assembly as defined in claim 3 wherein said retainer is removably mounted in said sleeve bore by means of cooperating threads.

6. The cracking die assembly as defined in claim 5 wherein said forward end face of said cracking die includes a concave depression for receiving an end portion of a nut to be cracked.

7. The cracking die assembly as defined in claim 2 wherein said annular gasket is fixedly mounted within said internal bore of said retainer by means of an annular channel formed in said internal bore and an annular locking ring which is an integral part of said annular gasket and which is disposed within said channel.

8. The cracking die assembly as defined in claim 1 wherein the annular gasket consists essentially of urethane plastic.

9. The cracking die assembly as defined in claim 1 wherein the conical end face of the annular gasket and the conical shoulder of the cracking die each have an angle of inclination of between about 30° and 60°.

10. In a nutcracking apparatus comprising a cracking die having a forward end face and a rearward end face, an anvil mounted opposite said forward end face of said die to define an opening therebetween which is adapted to receive a nut, means mounting said cracking die for limited movement toward and away from said opening, means mounting said anvil for limited movement toward and away from said opening and for biasing said anvil in a direction toward said opening so that a nut may be retained between said anvil and said cracking die, a free floating shuttle mounted rearwardly of said cracking die, and means for periodically sharply thrusting said shuttle forwardly into impacting engagement with said rearward end face of said cracking die such that a nut retained between said anvil and said cracking die will be cracked by the resulting forward movement of the cracking die, the improvement wherein said cracking die is included in a cracking die assembly which comprises a mounting sleeve having an internal bore which defines a central axis and which includes a forwardly facing radial shoulder intermediate its ends, a tubular retainer mounted within said bore of said sleeve forwardly of said shoulder, with said retainer including an internal bore which is coaxial with respect to the central axis, an annular gasket mounted within the internal bore of said retainer, with said annular gasket having a rearwardly facing conical end face which is spaced from the radial shoulder of said sleeve, a cracking die disposed coaxially within said internal bore of said retainer and including a radial flange disposed between said sleeve shoulder and said end face of said gasket, with said flange having an axial dimension less than the distance between said sleeve shoulder and said end face of said gasket for permitting limited axial movement of said die, and with said flange of said die including a forwardly facing conical shoulder which opposes the conical end face of said gasket and which has an inclination which matches the inclination of the conical end face of said gasket, and with said die having a forward end face which is adapted to engage the end of a nut to be cracked and an opposite end face which is perpendicular to said central axis.

* * * * *